US011117730B2

(12) United States Patent
Lapidot (10) Patent No.: US 11,117,730 B2
(45) Date of Patent: Sep. 14, 2021

(54) VACUUM CONTAINER, SYSTEM AND METHOD (71) Applicant: FRESHKEEP LTD., Tel Aviv (IL)

(72) Inventor: Tal Lapidot, Tel Aviv (IL)

(\*) Notice: Subject to any disclaimer, the term of this patent is extended or adjusted under 35 U.S.C. 154(b) by 160 days.

(21) Appl. No.: 16/084,713

(22) PCT Filed: Mar. 12, 2017

(86) PCT No.: PCT/IL2017/050313
§ 371 (c)(1),
(2) Date: Sep. 13, 2018

(87) PCT Pub. No.: WO2017/158591
PCT Pub. Date: Sep. 21, 2017

(65) Prior Publication Data
US 2019/0084749 A1  Mar. 21, 2019

(30) Foreign Application Priority Data
Mar. 13, 2016 (IL) .......................... 244564

(51) Int. Cl.
| B65D 81/20 | (2006.01) |
| B65B 31/04 | (2006.01) |
| B65D 51/16 | (2006.01) |
| B65B 31/00 | (2006.01) |
| A47J 47/02 | (2006.01) |
| B65B 25/00 | (2006.01) |

(52) U.S. Cl.
CPC .......... *B65D 81/2038* (2013.01); *A47J 47/02* (2013.01); *B65B 31/00* (2013.01); *B65B 31/04* (2013.01); *B65D 51/1688* (2013.01); *B65B 25/001* (2013.01)

(58) Field of Classification Search
CPC ............ B65D 51/1688; B65D 81/2038; B65B 31/04; B65B 31/041; B65B 31/046; B65B 31/047; B65B 25/001
See application file for complete search history.

(56) References Cited

U.S. PATENT DOCUMENTS 4,051,971 A  * 10/1977  Saleri ................. B65D 51/1683
                                                          215/260
5,398,811 A  *  3/1995  Latella, Jr. .............. A47J 47/04
                                                          206/524.8
(Continued)

FOREIGN PATENT DOCUMENTS

KR         100802404        2/2008

*Primary Examiner* — Andrew M Tecco
*Assistant Examiner* — Nicholas E Igbokwe
(74) *Attorney, Agent, or Firm* — Hulsey P.C.

(57) ABSTRACT a vacuum container and a system which includes a complementary base, including a three-part airway, a sealing lid, and a lid release button. The three-part airway features an internal air chamber, an extraction airway, and a one-way check-valve preventing ambient air from penetrating the internal air chamber through the extraction airway when vacuum sealed. The extraction airway extends between the top and the bottom of the container and includes an internal air extraction outlet, disposed at the top of and within the internal air chamber, and an external air extraction outlet outside the container, disposed at the bottom of the container, and configured to be coupled to an external air pump. A complementary method is also provided.

20 Claims, 9 Drawing Sheets (56) References Cited

U.S. PATENT DOCUMENTS

| | | | | |
|---|---|---|---|---|
| 5,651,470 A * | 7/1997 | Wu | ............................ | F16J 13/24 |
| | | | | 141/65 |
| 7,040,356 B2 * | 5/2006 | Tarlow | .................... | B65D 81/18 |
| | | | | 141/65 |
| 2002/0108657 A1 * | 8/2002 | Chen | ................... | B65D 81/2038 |
| | | | | 137/565.13 |
| 2003/0200874 A1 * | 10/2003 | Tarlow | ..................... | A23G 9/28 |
| | | | | 99/472 |
| 2007/0095713 A1 * | 5/2007 | Schooley | ............ | B65D 81/2015 |
| | | | | 206/524.8 |
| 2007/0265587 A1 * | 11/2007 | Chen | ................... | B65D 81/2038 |
| | | | | 604/319 |
| 2014/0034655 A1 * | 2/2014 | Wooldridge | ............ | B65D 81/30 |
| | | | | 220/592.27 |

* cited by examiner

VACUUM CONTAINER, SYSTEM AND METHOD

FIELD OF THE DISCLOSED TECHNIQUE

The disclosed technique generally relates to containers, and specifically pressurized containers.

BACKGROUND OF THE DISCLOSED TECHNIQUE

Nowadays, it is a common practice to use vacuum containers for the purpose of extended storage. Products which have an increased m deterioration rate when exposed to air, e.g., food products, will have an extended shelf-life when properly stored in a low-pressure environment, such as vacuum storage. Because of the variety of goods that can be stored in a vacuum container, including small grains, liquid or liquid-like substances, designers of vacuum containers place the air suction port at m the top of the container, usually embedded in the container's lid, for preventing blockage of the suction port by the stored substance.

SUMMARY OF THE DISCLOSED TECHNIQUE

In accordance with one aspect of the present invention, there is thus provided a vacuum container for providing a vacuum sealing thereof, which includes a three-part airway, a lid, and a lid release button. The three-part airway features an internal air chamber for containing contents such as products, fluids, and food, an extraction airway, for allowing extraction of air from the internal air chamber, and a one-way check-valve disposed in the extraction airway, for preventing ambient air from entering the internal air chamber through the extraction airway when vacuum sealed, and allowing passage of air when pressure is equalized in the internal air chamber airway portion. The extraction airway extends between the top and the bottom of the container and includes an internal air extraction outlet, disposed at the top of and within the internal air chamber, and an external air extraction outlet outside the container, disposed at the bottom of the container, and configured to be coupled to an external air pump for extracting air from the container when the internal air chamber is sealingly covered by the lid. The one-way check-valve is disposed in the extraction airway and separates an internal airway portion and an external airway portion of the extraction airway, for preventing ambient air from entering the internal air chamber through said extraction airway when vacuum sealed, and allowing passage of air when pressure is equalized in the internal airway portion and the internal chamber. The lid is fitted to sealingly cover the internal air chamber, wherein the internal air extraction outlet is disposed either at the lid or the side wall of the internal air chamber. The lid-release button allows for selected equalization of pressure within the covered internal air chamber for allowing release of the lid under pressurized container conditions.

In accordance with another aspect of the disclosed technique, there is provided a vacuum container system which includes, in addition to the vacuum container, a vacuum base which features an external air pump connectable to the external air outlet for extracting air from the container when sealingly covered by the lid. Optionally, the base contains a centering disk and a suction port which couples the internal extraction airway of the vacuum container with the air vacuum pump, and a connection sensor may detect when the vacuum container and the vacuum base are coupled. There may also be a transformer providing electricity from a power supply and a motor which activates the vacuum pump to reduce pressure in the covered container.

The extraction airway may be in fluid communication with the internal air chamber through the lid, the seal and walls of the container or solely through the walls of the container. Optionally, the release button is located in the lid of the vacuum container or in the walls of the vacuum container.

The vacuum container may further include a pump release button allowing for selected equalization of pressure within the external airway portion with ambient atmospheric pressure, while the check valve retains the internal air chamber vacuum sealed, for facilitating disconnection of the container from the pump under pressurized container conditions. The pump release button may be combined with the lid release button, and/or the check valve, in a single module, and the lid release button and the check valve may also be combined in a single module. The air pump may be further operational for selectively pumping air back into an external portion of the extraction airway, while the check valve retains the internal air chamber vacuum sealed, for facilitating disconnection of the container from the vacuum pump under pressurized container conditions. An optional T-valve may be disposed in fluid communication with the extraction airway and the pump, for reversing the pump suction direction when pumping air back into the extraction airway.

According to another aspect of the disclosed technique, there is provided a method for vacuum sealing a vacuum container for keeping contents, such as products and fluids, under vacuum until accessing required. The method includes sealingly closing an internal air chamber of the vacuum container with a lid, e.g., by a peripheral seal fitted between an upper/top lid and the vacuum container. The method further includes coupling in fluid communication the internal air chamber with an air pump, by an extraction airway extending between the top and the bottom of the vacuum container. The extraction airway includes an internal air extraction outlet disposed at the top of and within the container, an external air extraction outlet outside the vacuum container disposed at the bottom of the container, configured to be coupled to an external air pump, and a one-way check-valve disposed in the extraction airway and separating an internal airway portion and an external airway portion of the extraction airway, for preventing ambient air from penetrating the internal air chamber through the extraction airway when vacuum sealed, and allowing passage of air when pressure is equalized with ambient atmospheric pressure in the internal airway portion. The method further includes extracting air from the internal air chamber through the extraction airway by activating the pump to extract air, disconnecting the vacuum container from the air pump, while the check valve maintains the container vacuum sealed, and selectively vacuum-releasing of the container by activating a lid-release button for restoring relative pressure to the vacuum container allowing a release of the lid.

The coupling may include coupling in fluid communication the internal air chamber with an air pump disposed in a vacuum base, and optionally further centering the container on a centering disk of the base, detecting when the vacuum container and the vacuum base are coupled by a connection sensor, and coupling the extraction airway of the vacuum container with the vacuum pump of the vacuum base by a suction port.

The extraction airway may be in fluid communication through the lid, and the walls of the container, wherein the lid includes the internal outlet and the internal airway portion within the container, or in fluid communication through the walls of the container, wherein the walls include the internal outlet and the internal airway within the container. The lid release button may be disposed in the lid of the vacuum container or on the walls of the vacuum container.

Disconnecting may further include activating a pump release button allowing for selected equalization of pressure within the external airway portion, while the check valve retains the internal air chamber vacuum sealed, for facilitating disconnection of the container from the pump under pressurized container conditions.

The pump release button may be combined with the lid release button or the check valve, in a single module. The lid release button and the check valve may be combined in a single module.

Disconnecting may include selectively pumping air, with the air pump, back into an external portion of the extraction airway, while the check valve retains the internal air chamber vacuum sealed, for facilitating disconnection of the container from the vacuum pump under pressurized container conditions.

Disconnecting may further include reversing the pump suction direction when pumping air back into the extraction airway by means of a T-valve in fluid communication with the extraction airway and the pump.

BRIEF DESCRIPTION OF THE DRAWINGS

The present invention will be understood and appreciated more fully from the following detailed description taken in conjunction with the illustrations in which.

DETAILED DESCRIPTION OF THE EMBODIMENTS

The prior art placement of the suction port at the top of a container may be problematic and inconvenient. The disclosed technique provides a novel structure, system and method for a vacuum container that solve such inconvenience. In its broadest aspects, the disclosed technique introduces a vacuum container that can be easily placed over a base and thereby coupled to a vacuum pump, while the air is removed only via an opening in near the top of the container, and thereby avoiding suction of fluids and other contents settled at the bottom of the container, while providing easy removal of the container from the base and its disconnection from the vacuum pump under vacuum conditions. In accordance with one aspect of the present invention, there is thus provided a vacuum container for providing a vacuum sealing thereof and a system which includes the vacuum container and a complementary vacuum base. The vacuum container includes a three-part airway, a lid, and a lid release button. The three-part airway features an internal air chamber for containing products and fluids, an extraction airway, for allowing extraction of air from the internal air chamber, and a one-way check-valve disposed in the extraction airway in between the outlets, for preventing ambient air from penetrating the internal air chamber through the extraction airway when vacuum sealed, and allowing passage of air when pressure is equalized with ambient atmospheric pressure in the internal air chamber airway portion. The extraction airway includes an internal air extraction outlet, disposed at the top of and within the internal air chamber, and an external air extraction outlet outside the container, disposed at the bottom or the side wall of the container, and configured to be coupled to an external air pump for extracting air from the container when the internal air chamber is sealingly covered by the lid. The one-way check-valve is disposed in the extraction airway and separates an internal airway portion and an external airway portion of the extraction airway, for preventing ambient air from penetrating said internal air chamber through said extraction airway when vacuum sealed, and allowing passage of air when pressure is equalized with ambient atmospheric pressure in the internal airway portion and the internal chamber. The lid is fitted to sealingly cover the internal air chamber, wherein the internal air extraction outlet is disposed either at the lid or the side wall of the internal air chamber. The lid-release button allows for selected equalization of pressure within the covered internal air chamber for allowing release of the lid under pressurized container conditions.

The vacuum container system includes, in addition to the vacuum container, a vacuum base which includes an external air pump connectable to the external air outlet for extracting air from the container when sealingly covered by the lid.

Further, optionally, the base contains a centering disk and a suction port which couples the internal extraction airway of the vacuum container with the air vacuum pump, and a connection sensor may detect when the vacuum container and the vacuum base are coupled. There may also be a transformer providing electricity from a power supply and a motor which activates the vacuum pump to reduce pressure in the covered container. The extraction airway may be in fluid communication through the lid, the seal and walls of the container or solely through the walls of the container. Optionally, the release button is located in the lid of the vacuum container or in the walls of the vacuum container.

The vacuum container may further include a pump release button allowing for selected equalization of pressure within the external airway portion, while the check valve retains the internal air chamber vacuum sealed, for facilitating disconnection of the container from the pump under pressurized container conditions. The pump release button may be combined with the lid release button, and/or the check valve, in a single module, and the lid release button and the check valve may also be combined in a single module. The air pump may further operational for selectively pumping air back into an external portion of the extraction airway, while the check valve retains the internal air chamber vacuum sealed, for facilitating disconnection of the container from the vacuum pump under pressurized container conditions. An optional T-valve may be disposed in fluid communication with the extraction airway and the pump, for reversing the pump suction direction when pumping air back into the extraction airway.

According to another aspect of the disclosed technique, there is provided a method for vacuum sealing a vacuum container for keeping products and fluids under vacuum until accessing required. The method includes sealingly closing an internal air chamber of the vacuum container with a lid, e.g., by a peripheral seal fitted between an upper/top lid and the vacuum container. The method further includes coupling in fluid communication the internal air chamber with an air pump, by an extraction airway disposed in the vacuum container. The extraction airway includes an internal air extraction outlet disposed at the top of and within the container, an external air extraction outlet outside the vacuum container disposed at one of: the bottom and the side wall of the container, configured to be coupled to an external air pump, and a one-way check-valve disposed in the extraction airway and separating an internal airway portion and an external airway portion of the extraction airway, for preventing ambient air from penetrating the internal air chamber through the extraction airway when vacuum sealed, and allowing passage of air when pressure is equalized with ambient atmospheric pressure in the internal airway portion. The method further includes extracting air from the internal air chamber through the extraction airway by activating the pump to extract air, disconnecting the vacuum container from the air pump, while the check valve maintains the container vacuum sealed, and selectively vacuum-releasing of the container by activating a lid-release button for restoring relative pressure to the vacuum container allowing a release of the lid.

Figure 1:
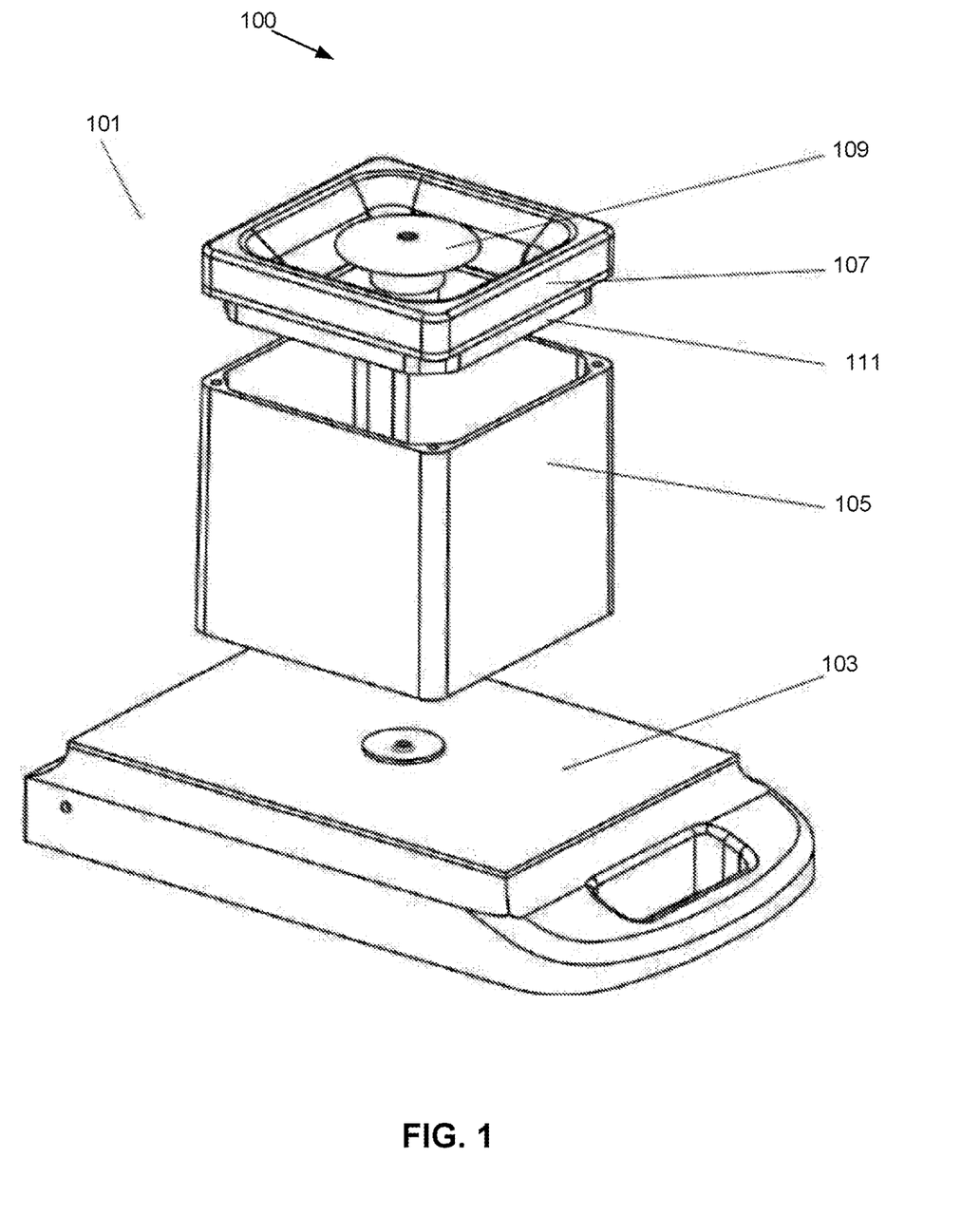
FIG. 1 is an isometric, exploded view of a vacuum container system, constructed and operative in accordance with one embodiment of the present invention.

Reference is now made to the figures, in which like numbers designate like parts. FIG. 1 is an isometric, exploded view of a vacuum container system, generally referenced 100, constructed and operative in accordance with one embodiment of the present invention. System 100 mainly includes a vacuum container 101, and a vacuum base 103. Vacuum container 101 features a container body 105, a lid 107, a lid quick-release button mechanism 109 (or button 109), and a peripheral seal 111 (disposed between lid 107 and container 101, allowing an airtight sealing of container 101 with lid 107). Vacuum base 103 includes or is associated with a device for automated extraction of air from container 101, i.e., a vacuum pump.

Figure 2:
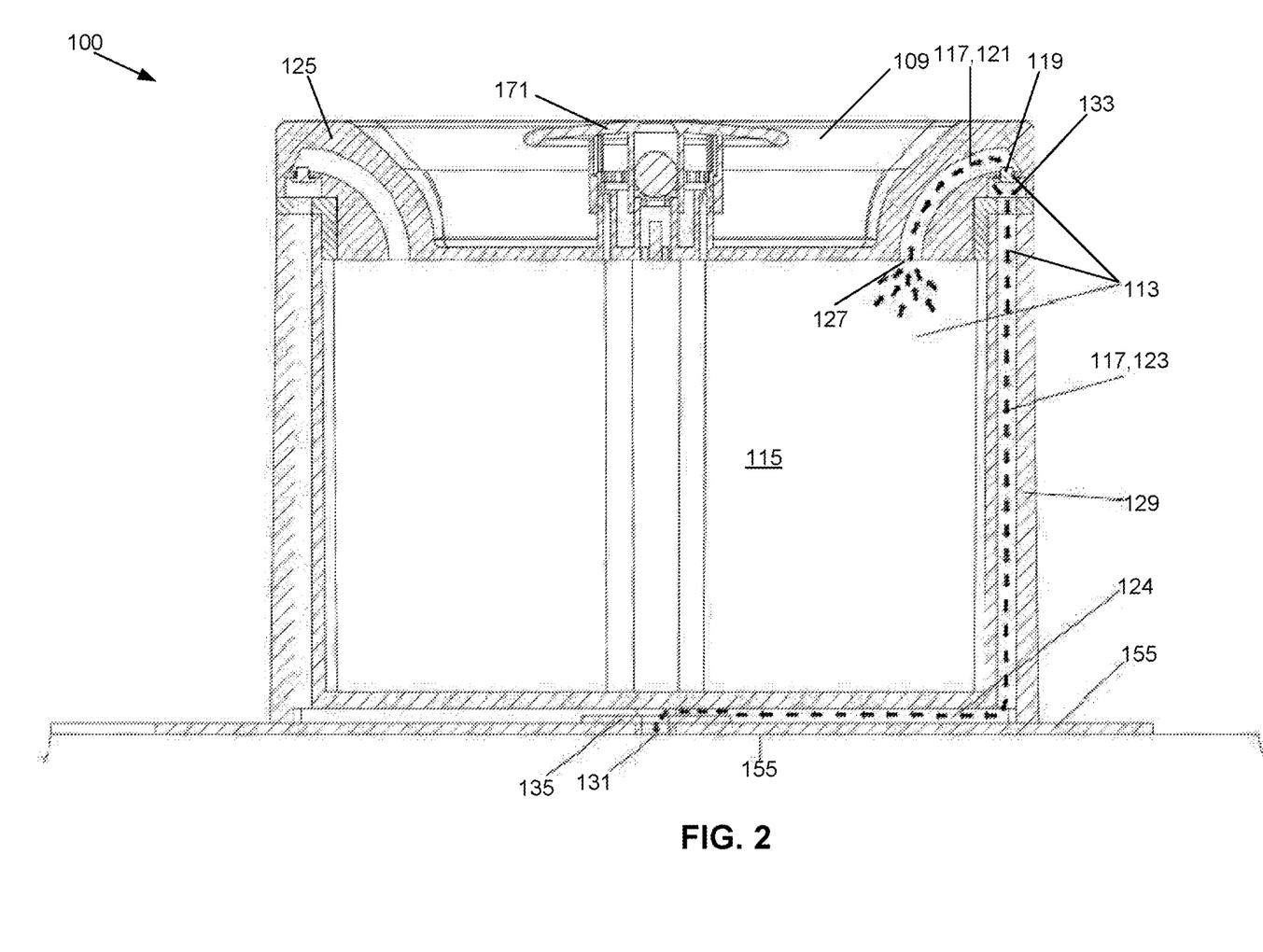
FIG. 2 is a cut sectional side view illustration of the container system of FIG. 1.
Figure 2A:
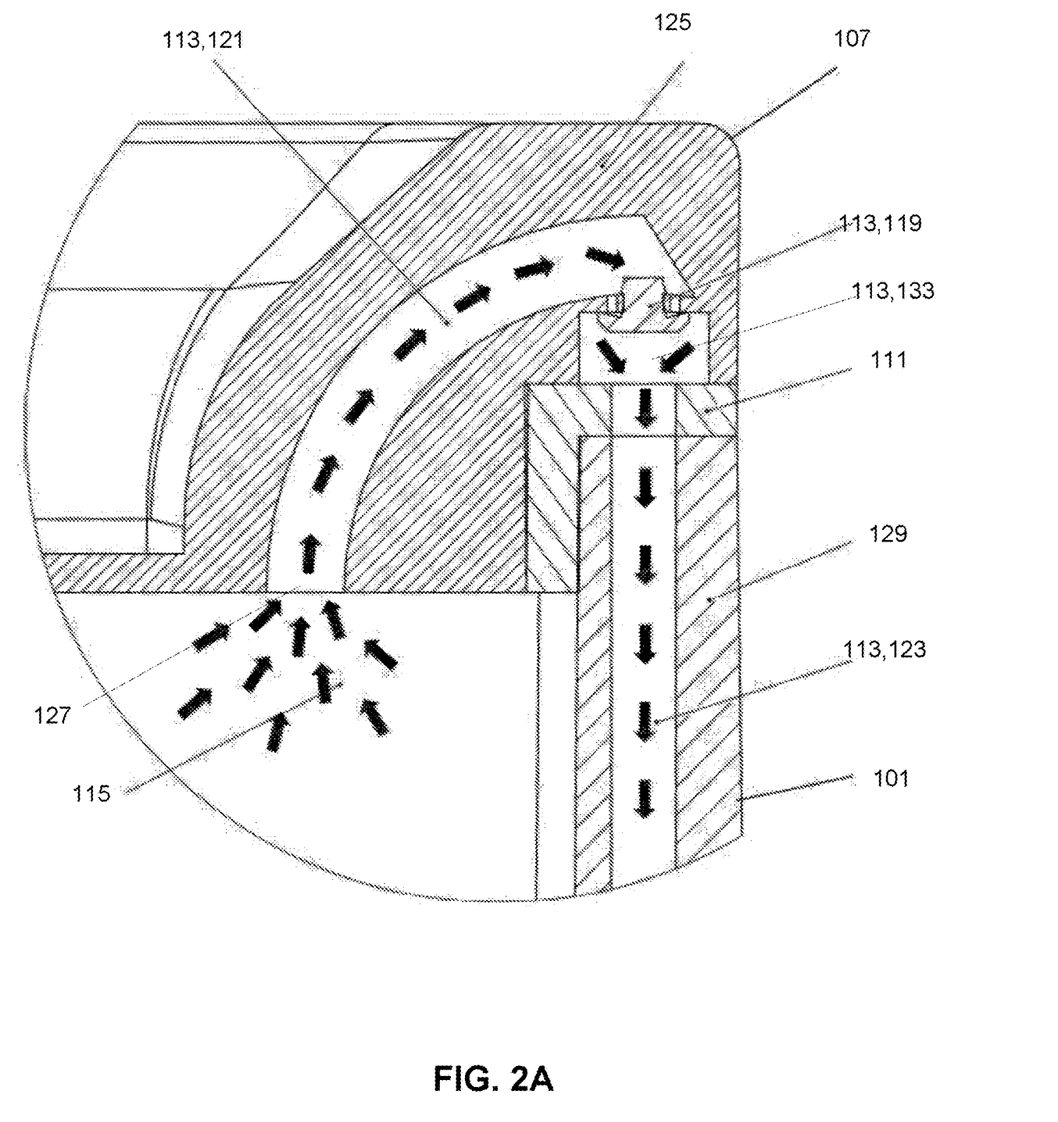
FIG. 2A is a detailed cut section illustration of the corner of the container of FIG. 1.

In reference to FIGS. 2 and 2A, FIG. 2 is a cut sectional side view illustration of system 100, and FIG. 2A, is a detailed cut section illustration of a corner of container 101. Container 101 includes a three-part airway 113, lid 107 and lid release button 109. Three-part airway 113 includes internal air chamber 115, for containing products and fluids, an extraction airway 117, for allowing extraction of air from internal air chamber 115, and one-way check-valve 119 which disposed in extraction airway 117, for preventing ambient air from penetrating internal air chamber 115 through extraction airway 117 when vacuum sealed, and allowing passage of air when pressure is equalized with ambient atmospheric pressure in internal air chamber 115. Check valve 119 separates internal airway portion 121 and external airway portion 123 of extraction airway 117. Lid 107 is comprised of a solid rigid frame 125, through which internal airway portion 121 is connected to internal air extraction outlet 127 and to check-valve 119. Container 101 includes outer shell 129, and external airway portion 123, which allow the conveying of a gas to external air extraction outlet 131 (also termed suction port 131). External airway portion 123 can be in the form of a single airway, or multiple airways, or formed between a double-wall inside container shell 129, or as external airway disposed over container shell 129, in the center thereof, or at one of the sides of container 101, as well as featuring a bottom portion 124 formed between the bottom of container body 105 when sealingly placed over sealing surface 155 of base 103 (FIG. 2). Internal air extraction outlet 127 is disposed at the top of and within internal air chamber 115. External air extraction outlet 131 is disposed outside container 101, either at the bottom thereof, as shown in FIG. 2, or on the side wall of container 101, and is configured to be coupled to an external air pump for extracting air from the container when sealingly covered by lid 107. Check-valve 119 is disposed in extraction airway 117 and separates internal airway portion 121 and external airway portion 123 of extraction airway 117, for preventing ambient air from penetrating internal air chamber 115 through the extraction airway when vacuum sealed, and allowing passage of air when pressure is equalized with ambient atmospheric pressure in the internal airway portion and the internal air. Check valve 119 may be disposed anywhere within extraction airway 117. Check valve 119 may be designed to be open at default, namely—to allow free removal of air from internal airway portion 121, and seal only when the pressure difference (between internal airway portion 121 and external airway portion 123) builds up over a predetermined threshold, due to the air suction action in external airway portion 123, or alternatively—to be closed at default, namely, to block passage of air, but open in response to build up of pressure difference over a predetermined threshold. In FIGS. 2 and 2A, extraction airway 117 extend into lid 107, and check-valve is disposed in lid 107 in proximity to engagement of lid 107 and container 101, wherein a small cavity 133 in seal 111 of lid 107 provides fluid communication between internal airway portion 121 at lid 107 and external airway portion 123 at container 101. Lid 107 is fitted to sealingly cover internal air chamber 115 of container 101. Internal air extraction outlet 127 is disposed at lid 107. However, extraction airway 117 may be disposed entirely, including its internal airway extraction portion, within container 101, in which case the internal air extraction outlet would be disposed at the side wall of internal air chamber 115 at or close to the top of chamber 115, to avoid suction of fluids and contents settled at the bottom of chamber 115).

Figure 3:
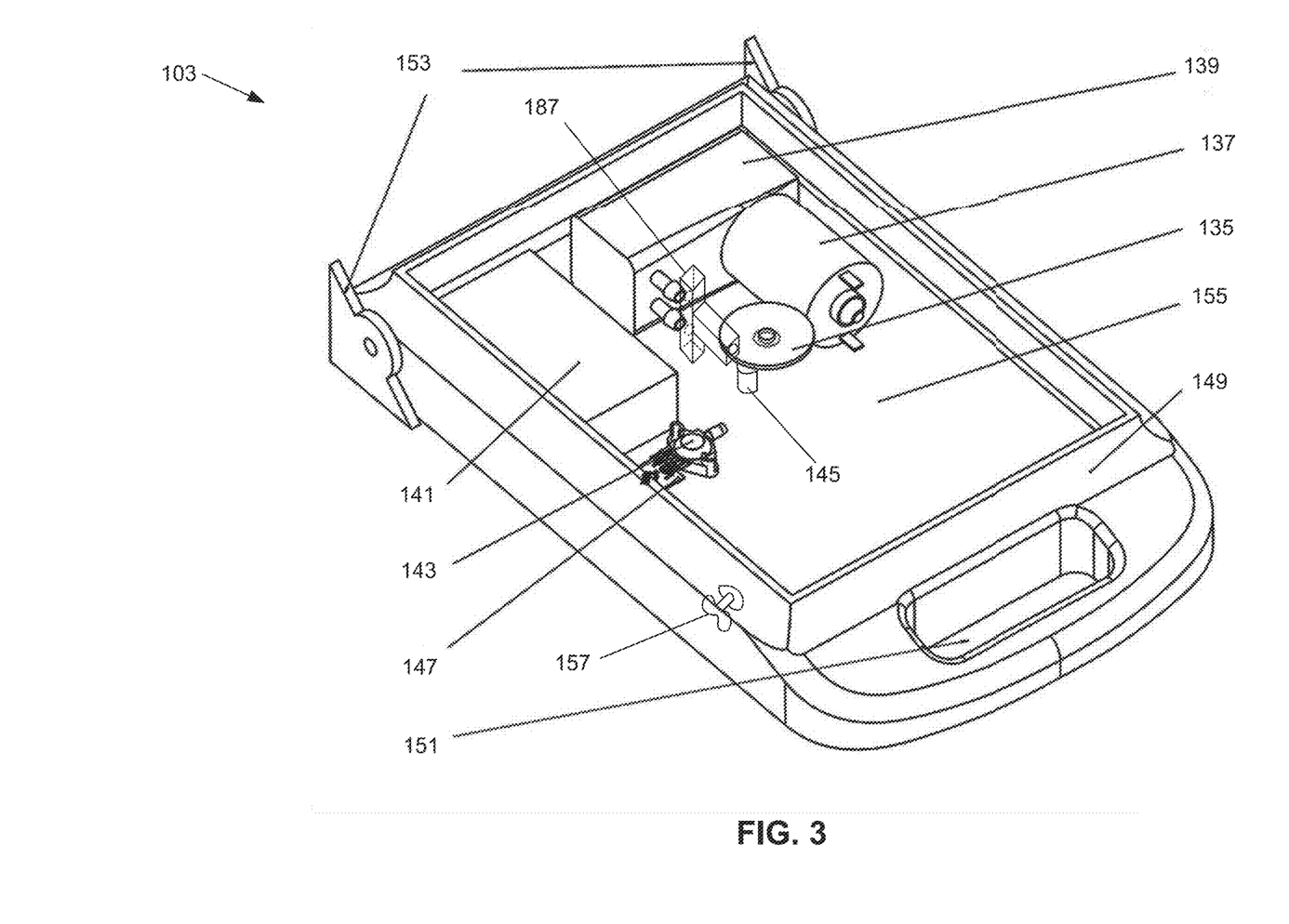
FIG. 3 is an isometric view illustration of the vacuum base system of FIG. 1.

Reference is now also made to FIG. 3, which is an isometric view illustration of vacuum base 103 of system 100. As shown in FIG. 3, vacuum base 103 includes a sealing surface 155 (shown as "transparent" in FIG. 3 for the sake of exposing other components, as is seen in FIGS. 1 and 2), a centering disc 135, a motor 137, an external air vacuum pump 139, a transformer 141, an air pressure sensor 143, a force pressure sensor 145 (which exemplifies any other connection sensor, not shown), a controller (control board) 147, a base outer shell 149, a lifting handhold 151 and folding hinges 153. Transformer 141 supplies electric current to a controller 147 for the operation of sensors 143, 145 and motor 137. Motor 137 activates pump 139, which creates negative or positive pressure based on controller 147 command. Air pressure sensor 143 and pump 139 are connected to a centering disc 135 via air tubes. Air pressure sensor 143 relays the pressure created by pump 139 to controller 147.

As shown in FIG. 2, external airway portion 123 allows for conveying of air from the top of container 101 to the bottom of container 101. When placing container 101 on sealing surface 155, gravitation force is created on sealing surface 155 by the weight of container 101 creates an air tight seal between outer shell 129 and sealing surface 155, thereby triggering the force pressure sensor 145. A command from force pressure sensor 145 will trigger controller 147 to activate motor 137 of pump 139, pump 139 will create a negative air pressure at the suction port 131 at centering disc 135, the pressure difference will cause air to from three-part airway 113 within container 101, to be extracted from internal airway chamber 115 through internal airway portion 121 in lid 107, passing check-valve 119 and cavity 133 in seal 111, through external airway portion 123 to the bottom of container 101 to suction port 131. Once a predetermined internal pressure in container 101 has been reached, the creation of negative air pressure at suction port 131 will cease stop by the command of controller 147 in response to its measure by air pressure sensor 143.

Container 101, may now be removed from base 103, while retaining its vacuum. The vacuum created by pump 139 adheres portion 123 and pump 139 to one another by the force of negative pressure present within. To facilitate removal of container 101 from pump 139, vacuum container 101 may further comprise a pump release button such as button 157 (or buttons 159, 161 exemplified in FIGS. 6 and 7, further described below). Button 157 allows for selected equalization of pressure within external airway portion 123, while check valve 119 retains internal air chamber 115 vacuum sealed, for facilitating disconnection of container 101 from pump 139 under pressurized container conditions.

Figure 4:
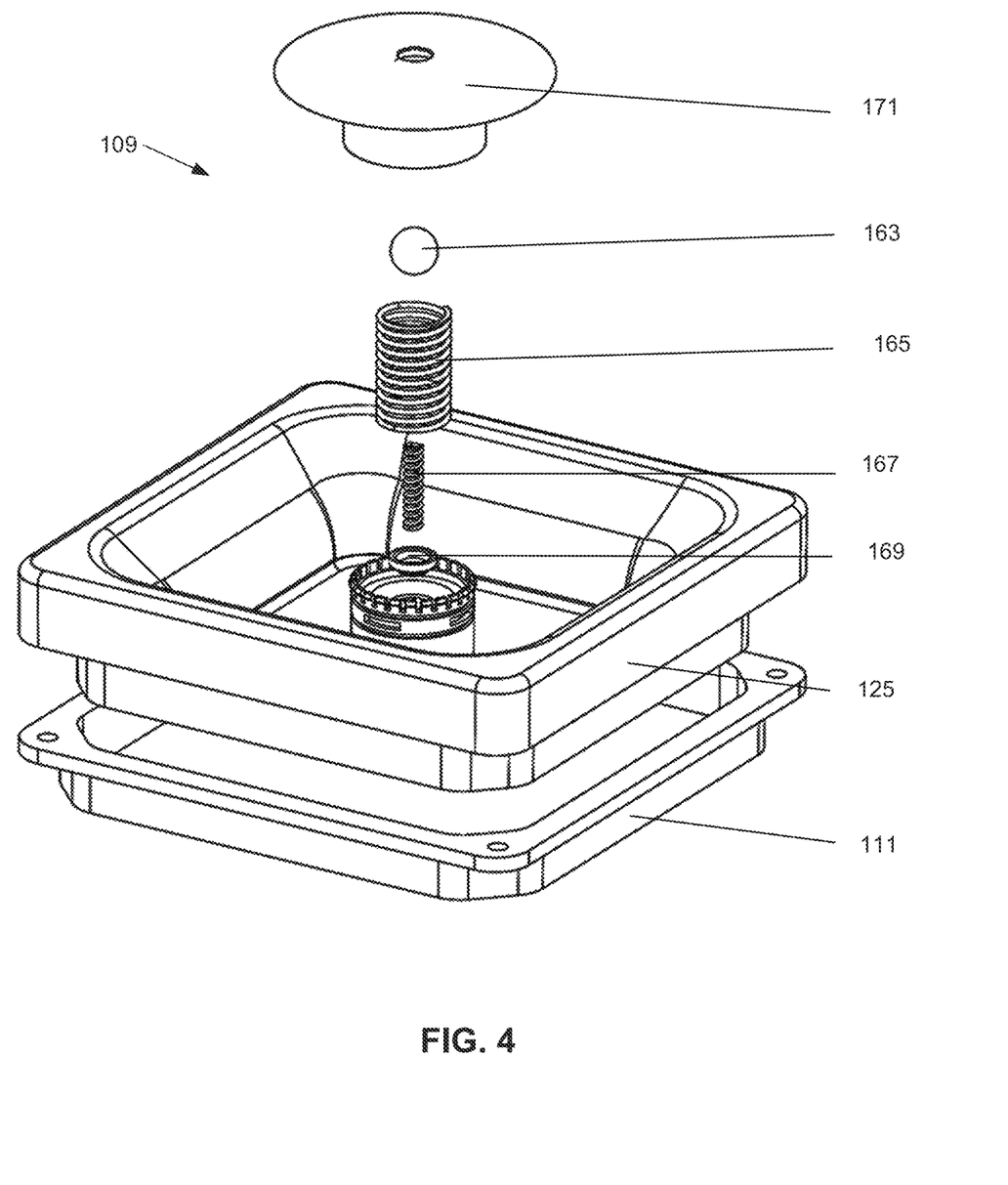
FIG. 4 is an exploded view illustration of the lid of FIG. 1.

When access to the contents in container 101 is sought, the vacuum that tightly connects lid 107 to container 101 must be relieved. To this end, opening Lid-release button 109 is disposed at lid 107 and allows for selected equalization of pressure within the lid 107 covered internal air chamber 115 for allowing release of lid 107 under pressurized container conditions. As shown in FIG. 4, which is an exploded view illustration of lid 107 of system 100, lid 107 mainly comprises a quick-release button 109, an integrated indicator 163, a compression spring 165, a compression spring 167, a seal 169, and a solid rigid frame 125. Alternatively, a lid release button may be disposed anywhere at the wall of container 101, preferably at the top (for avoiding interference with contents), as further described below in reference to FIG. 7.

Figure 5:
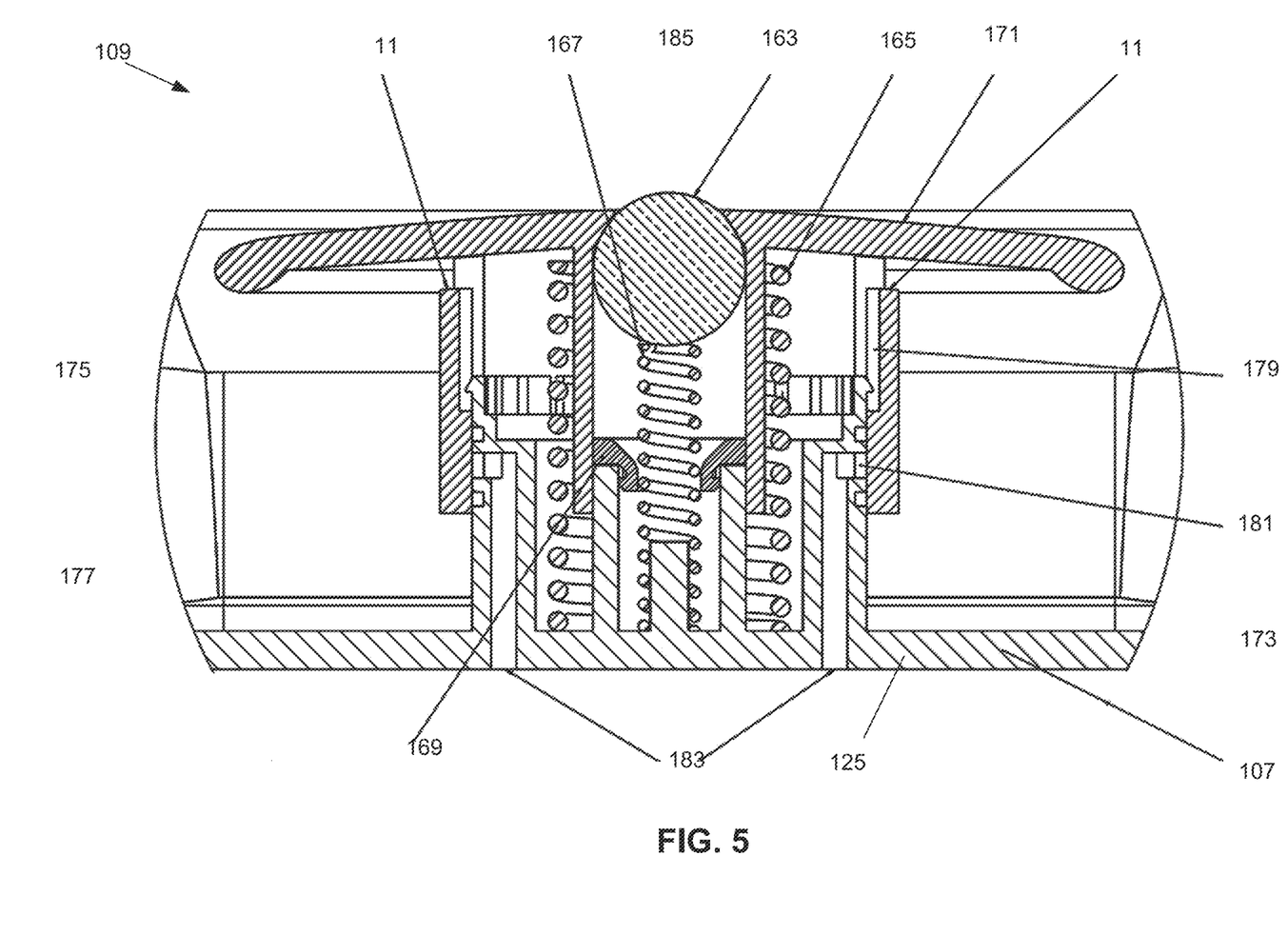
FIG. 5 is a detailed cut section of a quick-release mechanism of FIG. 1.

As shown in FIG. 5, which is a detailed cut section of a quick-release mechanism 1 of lid 107 of system 100, button 171 is fitted on a centering rod 173. Compression spring 165 keeps button 171 spaced at maximum distance from frame 125 of lid 107, and a locking limit tooth 175 prevents slackness and loosening of button 171 from frame 125, once installed. O-rings 177 seal an air path between button 171 and lid 107, when button 171 is in a decompressed position.

When button 171 is manually pressed by the user to a compressed, pressure equalizing, position, undercut 179 will connect with peripheral groove 181 in lid 107, and allow air to enter through groove 11 into container 101, through undercut 179 and groove 181 to slit 183 in lid 107. Thus, allowing passage of air and restoring pressure inside container 101. Upon ceasing a manual pressing of button 171, compression spring 165 will push button 171 upwards.

Additionally, when negative pressure is built inside of container 101, the pressure difference between the sides of indicator 163 will apply surface tension force on indicator 163, causing indicator 163 to move downwards, while compressing compression spring 167 until reaching seal 169. Breaking of vacuum will occur with the manual pressing of button 171, wherein compression spring 167 will push the indicator upwards to internally flanging corner limitation 185 disposed at the top of button 171. The position of indicator 163 is related to button 171, indicating the pressure status inside the container to a viewer from above.

Figure 6:
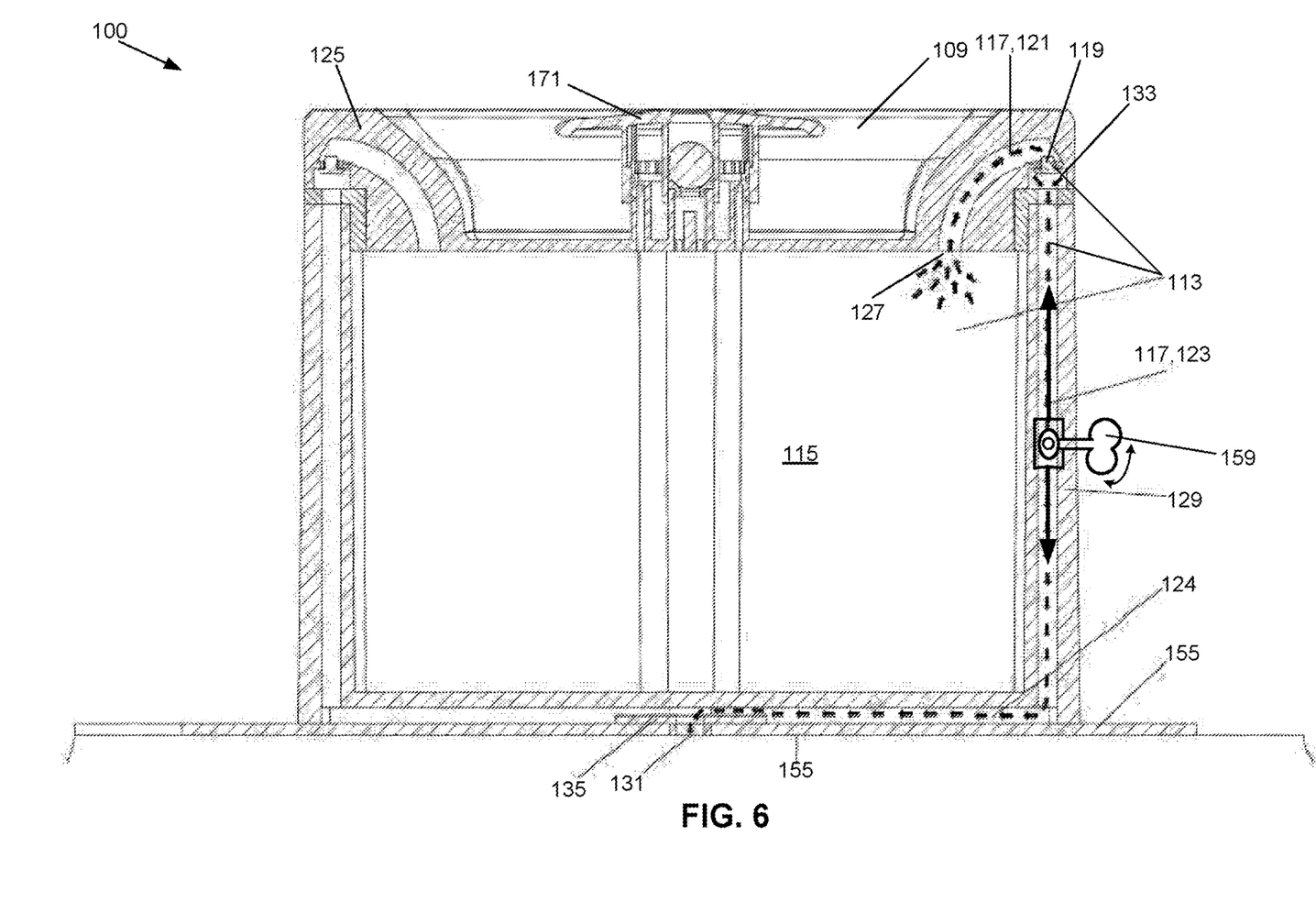
FIG. 6 is a modification of the container shown in FIG. 1 featuring a pump release button.
Figure 7:
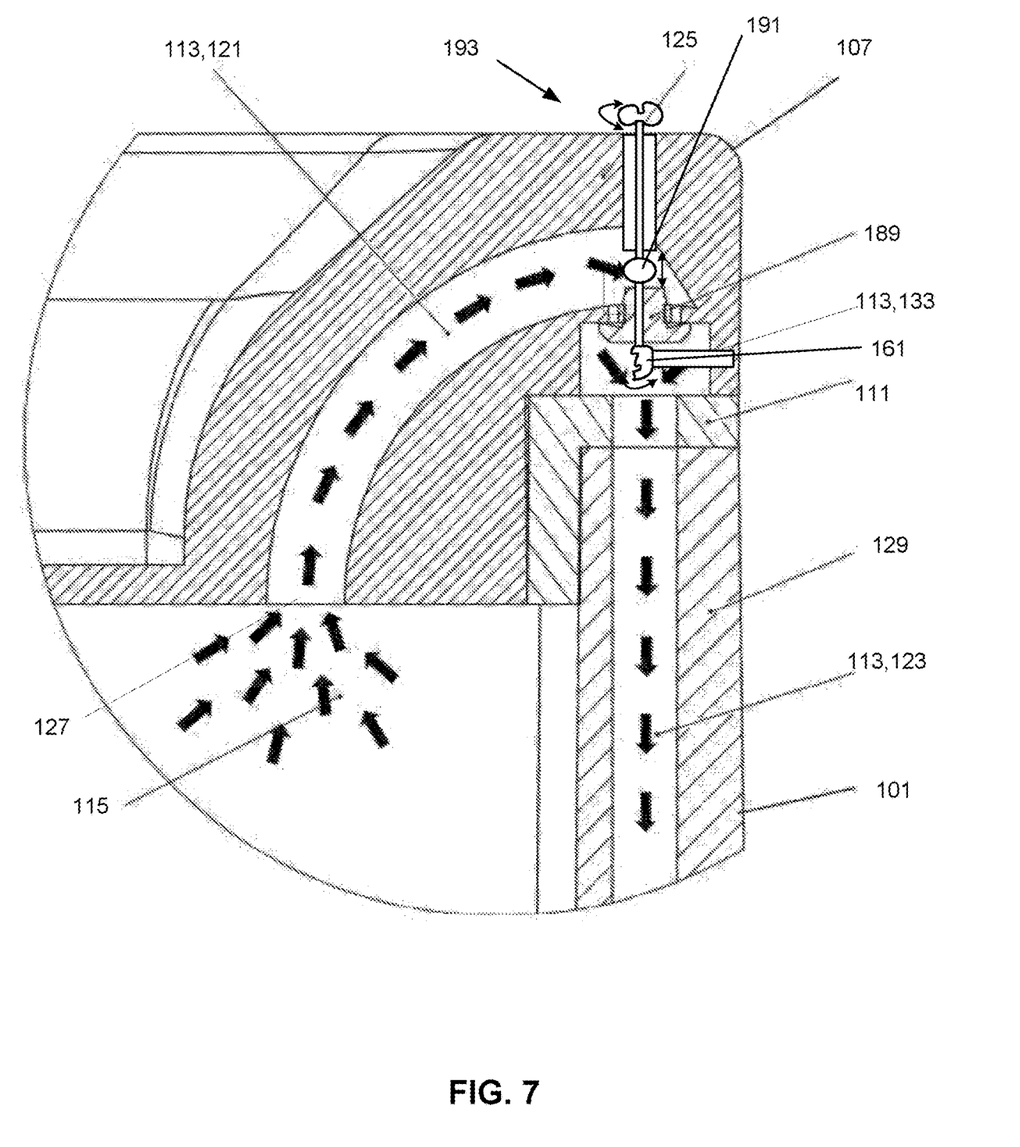
FIG. 7 is a modification of the container shown in FIG. 1 featuring a one-way check valve, a lid release button, and a pump release button in a single module.

Reference is now made to FIG. 6, which is a modification of the container shown in FIG. 1 featuring a pump release button 159. It is noted that upon suction of air by pump 139 from container 101, container 101 adheres at center disc 52 to base 103 by the force of negative pressure within airway 113 and the airways in base 103. The user may be required to apply substantial force for separating container 101 from base 103. One measure to facilitate separation may be reversing the function of air pump 139. For example, using air pump 139 for selectively pumping air back into external portion 123 of extraction airway 117, while check valve 119 retains internal air chamber 115 vacuum sealed, for facilitating disconnection of container 101 from vacuum pump 139 under pressurized container conditions. Although reversal of the operation of pump 139 is possible, it would be more convenient to implement a T-valve in fluid communication with extraction airway 117 and pump 139, for reversing the pump suction direction (without reversing the pump action) when pumping air back into extraction airway 117. An example of such optional T-valve is shown as T-valve 187 in FIG. 3.

Another measure to facilitate removal of container 101 from pump 139, is a pump release button, an example of which was mention above (button 157). Vacuum container 101, as well as base 103, may further comprise a pump release button such as pump release button 159 of FIG. 6, or pump release button 157 of FIG. 3. Buttons 159 or 157, when activated, admit air into portion 123 and the sealed air space, or airway, within base 103 air. Accordingly, buttons 159 or 157 allow for selected equalization of pressure within external airway portion 123, while check valve 119 retains internal air chamber 115 vacuum sealed, for facilitating disconnection of container 101 from pump 139 under pressurized container conditions.

If pump release button, similar to buttons 159, 157 is installed in container 101, it may be combined with the lid release button (similar to lid release button mechanism 1), and/or check valve 119, in a single module. The lid release button and the check valve may also be combined in a single module. In reference to FIG. 7, there is shown is a modification of container 101 shown in FIG. 1 featuring a one-way check valve 189, a lid release button 191, and a pump release button 161, all combined in a single module 193.

Vacuum container 101 utilizes integrated air-ways inside outer shell 129, wherein external air extraction outlet or suction port 131 is placed on a side-wall or the bottom of container 101 rather than at the top of container 101. Vacuum container 101 reduces efforts required by a user to extract air from container 101, i.e., by utilizing a container with a bottom-disposed suction port. Suction port 131, is simple in construction, and disposed on the bottom of vacuum container 101, right above a complementary port 136 of base 103 that lead to a pump. Vacuum container 101 is equipped with lid quick-release button mechanism 1. Vacuum container 101 may feature an integrated indicator 163 of internal pressure conditions. It is noted that vacuum base 103 is designed for use such that the only requirement is that suction port 131 is completely covered by base 103. System 100 includes a pump or may be coupled with a device for extracting air out of vacuum container 101 with bottom suction port 131.

Figure 8:
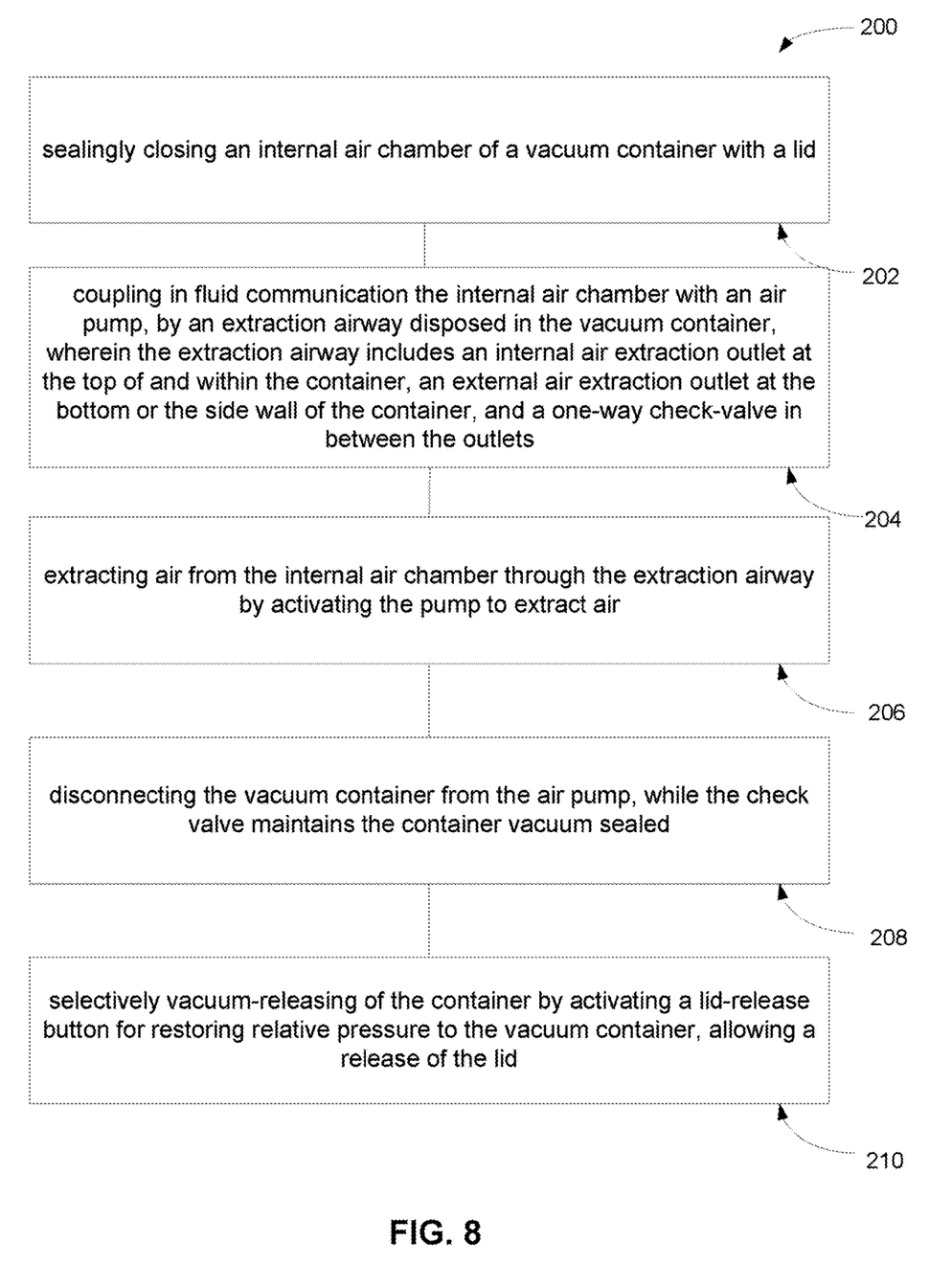
FIG. 8 is a block diagram of a method for vacuum sealing a vacuum container, operative in accordance with another embodiment of the present invention.

In accordance with another aspect of the disclosed invention, there is provided a method for vacuum sealing a vacuum container system for keeping products and fluids under vacuum until accessing required. Reference is now made to FIG. 8, which is a block diagram of method 200 for vacuum sealing a vacuum container, operative in accordance with another embodiment of the present invention. Procedure 202 of method 200 includes sealingly closing an internal air chamber of the vacuum container with a lid, e.g., by a peripheral seal fitted between an upper/top lid and the vacuum container. In reference to FIGS. 1-7, lid 107 sealingly closes internal air chamber 115 of vacuum container 101, e.g., by a peripheral seal 111 fitted between the upper/top lid 107 and vacuum container 101.

Procedure 204 of method 200 includes coupling in fluid communication the internal air chamber with an air pump, by an extraction airway disposed in the vacuum container. The extraction airway includes an internal air extraction outlet disposed at the top of and within the container, an external air extraction outlet outside the vacuum container disposed at one of: the bottom and the side wall of the container, configured to be coupled to an external air pump, and a one-way check-valve disposed in the extraction airway and separating an internal airway portion and an external airway portion of the extraction airway, for preventing ambient air from penetrating the internal air chamber through the extraction airway when vacuum sealed, and allowing passage of air when pressure is equalized with ambient atmospheric pressure in the internal airway portion. In reference to FIGS. 1-7, internal air chamber 115 is coupled in fluid communication with air pump 139, by extraction airway 117 which is disposed in vacuum container 101. Extraction airway 117 includes internal air extraction outlet 127 which is disposed at the top of and within container 101 (al lid 107), external air extraction outlet 131 which is disposed outside vacuum container 101 disposed at the bottom thereof, and is configured to be coupled to external air pump 139. One-way check-valve 119 is disposed in extraction airway 117 and separates internal airway portion 121 and external airway portion 123 of extraction airway 117, for preventing ambient air from penetrating internal air chamber 115 through extraction airway 117 when vacuum sealed, and allows passage of air when pressure is equalized in internal airway portion 121.

Procedure 204 of coupling may further include coupling in fluid communication the internal air chamber with an air pump disposed in a vacuum base. In reference to FIGS. 1-7, internal air chamber 115 is coupled in fluid communication with air pump 139 which is disposed in vacuum base 103.

Procedure 204 of coupling may further include coupling may further include centering the container on a centering disk of the base, detecting when the vacuum container and the vacuum base are coupled by a connection sensor, and coupling the extraction airway of the vacuum container with the vacuum pump of the vacuum base by a suction port. In reference to FIGS. 1-7, container 101 is centered on centering disk 52 of base 103. Pressure sensor 145 which function as a connection sensor, detects when vacuum container 101 and vacuum base 103 are coupled. Extraction airway 117 of vacuum container 101 is coupled with vacuum pump 139 of vacuum base 103 by suction port 131.

Procedure 206 of method 200 includes extracting air from the internal air chamber through the extraction airway by activating the pump to extract air. In reference to FIGS. 1-7, air from internal air chamber 115 is extracted through extraction airway 117 by activating pump 139 to extract air.

Procedure 208 of method 200 includes disconnecting the vacuum container from the air pump, while the check valve maintains the container vacuum sealed. In reference to FIGS. 1-7, vacuum container 101 is disconnected from air pump 139, while check valve 119 maintains container 101 vacuum sealed. Procedure 208 of disconnecting may further include activating a pump release button allowing for selected equalization of pressure within the external airway portion, while the check valve retains the internal air chamber vacuum sealed, for facilitating disconnection of the container from the pump under pressurized container conditions. In reference to FIGS. 1-7, pump release button 159, 157 or 161 is activated, allowing for selected equalization of pressure within external airway portion 123, while check valve 119 (or 189) retains internal air chamber 115 vacuum sealed, for facilitating disconnection of container 101 from pump 139 under pressurized container conditions.

Procedure 208 of disconnecting may further include selectively pumping air, with the air pump, back into an external portion of the extraction airway, while the check valve retains the internal air chamber vacuum sealed, for facilitating disconnection of the container from the vacuum pump under pressurized container conditions. In reference to FIGS. 1-7, air pump 139 selectively pumps air back into external portion 123 of extraction airway 117, while check valve 119 retains internal air chamber 115 vacuum sealed, for facilitating disconnection of container 101 from vacuum pump 139 under pressurized container conditions.

Procedure 208 of disconnecting may further include reversing the pump suction direction when pumping air back into the extraction airway by means of a T-valve in fluid communication with the extraction airway and the pump. In reference to FIGS. 1-7, pump 139 suction direction is reversed when pumping air back into extraction airway 117 by means of a T-valve 187 which is in fluid communication with extraction airway 117 and pump 139.

Procedure 210 of method 200 includes selectively vacuum-releasing of the container by activating a lid-release button for restoring relative pressure to the vacuum container allowing a release of the lid. In reference to FIGS. 1-7, lid-release button 109 (or 171) is activated for restoring relative pressure to vacuum container 101 for allowing release of lid 107, thereby allowing selectively release of the vacuum in container 101.

The extraction airway may be in fluid communication through the lid, and the walls of the container, wherein the lid includes the internal outlet and the internal airway portion within the container, or wherein the walls include the internal outlet and the internal airway within the container. In reference to FIGS. 1-7, extraction airway 117 is in fluid communication through lid 107, and the walls of outer shell 129 of container 101, wherein lid 107 includes internal outlet 127 and internal airway portion 121 within container 101. The lid release button may be located in the lid of the vacuum container or on the walls of the vacuum container. In reference to FIGS. 1-7, lid release button 109 is be located in lid 107 of vacuum container 101.

The pump release button may be disposed either in base 103 or container 101. The pump release button may be combined with at least one of: the lid release button, and the check valve, in a single module. In reference to FIGS. 1-7, pump release button 157 is disposed in base 103, and pump release buttons 159 and 161 are disposed in container 101. Pump release button 161 is combined with lid release button 191 and check valve 189, in a single module. The lid release button and the check valve may be combined in a single module. In reference to FIGS. 1-7, lid release button 191 and check valve 189 are combined in a single module.

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. A vacuum container for providing vacuum sealing thereof, comprising:
   (1) a three-part airway comprising:
      (a) an internal air chamber for containing products and fluids;
      (b) an extraction airway extending between the top and the bottom of the container, for allowing extraction of air from said internal air chamber; said extraction airway comprising:
         (i) an internal air extraction outlet, disposed at the top of and within said internal air chamber; and
         (ii) an external air extraction outlet outside said container, disposed at the bottom of said container, configured to be coupled to an external air pump for extracting air from said container; and
      (c) a one-way check-valve disposed in said extraction airway and separating an internal airway portion and an external airway portion of said extraction airway, for preventing ambient air from penetrating said internal air chamber through said extraction airway when vacuum sealed, and allowing passage of air from said internal air chamber through said extraction airway when pressure is equalized in said internal airway portion and said internal air chamber;
   (2) a lid fitted to sealingly cover said internal air chamber, wherein said internal air extraction outlet is disposed at one of: said lid; and the side wall of said internal air chamber; and
   (3) a lid-release button allowing for selected equalization of pressure within said covered internal air chamber for allowing release of said lid under pressurized container conditions.

2. A vacuum container system for providing vacuum sealing of a container, comprising:
   (I) a vacuum container comprising:
      (1) a three-part airway comprising:
         (a) an internal air chamber for containing products and fluids;
         (b) an extraction airway extending between the top and the bottom of the container, for allowing extraction of air from said internal air chamber; said extraction airway comprising:
            (i) an internal air extraction outlet, disposed at the top of and within said internal air chamber; and
            (ii) an external air extraction outlet outside said container, disposed at the bottom of said container, configured to be coupled to an external air pump for extracting air from said container; and
         (c) a one-way check-valve disposed in said extraction airway and separating an internal airway portion and an external airway portion of said extraction airway, for preventing ambient air from penetrating said internal air chamber through said extraction airway when vacuum sealed, and allowing passage of air from said internal air chamber through said extraction airway when pressure is equalized in said internal airway portion and said internal air chamber;
      (2) a lid fitted to sealingly cover said internal air chamber, wherein said internal air extraction outlet is disposed at one of: said lid; and the side wall of said internal air chamber; and
      (3) a lid-release button allowing for selected equalization of pressure within said covered internal air chamber for allowing release of said lid under pressurized container conditions; and (II) a vacuum base to which said vacuum container can be releasably coupled, comprising said external air pump connectable to said external air outlet for extracting air from said container when sealingly covered by said lid.

3. The vacuum container of claim 1 or 2, wherein said extraction airway is in fluid communication through said lid and the walls of said container, wherein said lid comprises said internal outlet and said internal airway portion within said container.

4. The vacuum container of claim 1 or 2, wherein said extraction airway is in fluid communication through the walls of said container, wherein said walls comprise said internal outlet and said internal airway within said container.

5. The vacuum container of claim 1 or 2, wherein said lid-release button is located at one of:
   in the lid of said vacuum container; and
   on the walls of said vacuum container.

6. The vacuum container of claim 1 or 2, further comprising a pump-release button allowing for selected equalization of pressure within said external airway portion, while said check valve retains said internal air chamber vacuum sealed, for facilitating disconnection of said container from said pump under pressurized container conditions.

7. The vacuum container of claim 6, wherein said pump-release button is combined with at least one of: said lid-release button, and said check valve, in a single module.

8. The vacuum container of claim 1 or 2, wherein said lid-release button and said check valve are combined in a single module.

9. The vacuum container system of claim 2, further comprising:
   a centering disk;
   a connection sensor detecting when said vacuum container and said vacuum base are coupled; and
   a suction port coupling said extraction airway of said vacuum container with said vacuum pump of said vacuum base.

10. The vacuum container system of claim 2, wherein said air pump is further operational for selectively pumping air back into an external portion of said extraction airway, while said check valve retains said internal air chamber vacuum sealed, for facilitating disconnection of said container from said vacuum pump under pressurized container conditions.

11. The vacuum container system of claim 10, further comprising a T-valve in fluid communication with said extraction airway and said pump, for reversing the pump suction direction when pumping air back into said extraction airway.

12. A method for vacuum sealing a vacuum container for keeping products and fluids under vacuum until accessing required, the method comprising the procedures of:
   sealingly closing an internal air chamber of said vacuum container with a lid;
   coupling in fluid communication said internal air chamber with an air pump, by an extraction airway extending between the top and the bottom of the container, wherein the extraction airway comprises:
      (i) an internal air extraction outlet disposed at the top of and within said container;

(ii) an external air extraction outlet outside said vacuum container disposed at the bottom of said container, configured to be coupled to an external air pump for extracting air from said container; and (iii) a one-way check-valve disposed in said extraction airway and separating an internal airway portion and an external airway portion of said extraction airway, for preventing ambient air from penetrating said internal air chamber through said extraction airway when vacuum sealed, and allowing passage of air when pressure is equalized in said internal airway portion and said internal air chamber;

extracting air from said internal air chamber through said extraction airway by activating said pump to extract air;

disconnecting said vacuum container from said air pump, while said check valve maintains said container vacuum sealed; and selectively vacuum-releasing of said container by activating a lid-release button for restoring relative pressure to said vacuum container allowing a release of said lid.

13. The method of claim 12 wherein said procedure of coupling comprises coupling in fluid communication said internal air chamber with an air pump disposed in a vacuum base.

14. The method of claim 13, wherein said procedure of coupling further comprises:
centering said container on a centering disk of said base;
detecting when said vacuum container and said vacuum base are coupled by a connection sensor; and
coupling said extraction airway of said vacuum container with said vacuum pump of said vacuum base by a suction port.

15. The method of claim 12, wherein said extraction airway is in fluid communication through said lid, and the walls of said container, wherein said lid comprises said internal outlet and said internal airway portion within said container.

16. The method of claim 12, wherein said extraction airway is in fluid communication through the walls of said container, wherein said walls comprise said internal outlet and said internal airway within said container.

17. The method of claim 12, wherein said lid-release button is located at one of:
in the lid of said vacuum container; and
on the walls of said vacuum container.

18. The method of claim 12, wherein said procedure of disconnecting further comprises activating a pump-release button allowing for selected equalization of pressure within said external airway portion, while said check valve retains said internal air chamber vacuum sealed, for facilitating disconnection of said container from said pump under pressurized container conditions.

19. The method of claim 12, wherein said procedure of disconnecting comprises selectively pumping air, with said air pump, back into an external portion of said extraction airway, while said check valve retains said internal air chamber vacuum sealed, for facilitating disconnection of said container from said vacuum pump under pressurized container conditions.

20. The method of claim 12, wherein said procedure of disconnecting further comprises reversing the pump suction direction when pumping air back into said extraction airway by means of a T-valve in fluid communication with said extraction airway and said pump.

* * * * *